United States Patent
Shukla et al.

(10) Patent No.: US 9,842,338 B1
(45) Date of Patent: Dec. 12, 2017

(54) SYSTEM TO IDENTIFY VULNERABLE CARD READERS

(71) Applicant: Palantir Technologies Inc., Palo Alto, CA (US)

(72) Inventors: Ananya Shukla, New York City, NY (US); Daniel Norris, New York City, NY (US)

(73) Assignee: Palantir Technologies Inc., Palo Alto, CA (US)

( * ) Notice: Subject to any disclaimer, the term of this patent is extended or adjusted under 35 U.S.C. 154(b) by 0 days.

(21) Appl. No.: 15/357,655

(22) Filed: Nov. 21, 2016

(51) Int. Cl.
  *G06K 5/00* (2006.01)
  *G06Q 30/00* (2012.01)
  *G07F 19/00* (2006.01)
  *G06K 7/01* (2006.01)
  *G06K 19/073* (2006.01)
  *G06F 17/30* (2006.01)

(52) U.S. Cl.
  CPC ... *G06Q 30/0185* (2013.01); *G06F 17/30876* (2013.01); *G06K 7/01* (2013.01); *G06K 19/073* (2013.01); *G07F 19/2055* (2013.01)

(58) Field of Classification Search
  CPC .. G06F 17/30876; G06K 7/01; G06K 19/073; G07F 19/2005; G07F 19/20; G07F 7/1008; G06Q 20/1085; G06Q 20/341; G06Q 30/02

USPC ......................................... 235/380, 375, 379
See application file for complete search history.

(56) References Cited

U.S. PATENT DOCUMENTS 9,412,108 B2 *  8/2016  Wang ................. G06Q 20/4016

* cited by examiner

*Primary Examiner* — Karl D Frech
(74) *Attorney, Agent, or Firm* — Schwegman Lundberg & Woessner, P.A.

(57) ABSTRACT

Example embodiments relate to a network-based vulnerability detection system configured to access a database of customer transaction data corresponding to a set of card readers that includes transaction codes, receive an identification of a set of compromised card readers among the set of card readers, identify common transaction codes within the transaction data of the set of compromised card readers, and correlate the common transaction codes to one or more instances of fraud associated with the compromised set of card readers. In some example embodiments, the vulnerability detection system may be applied to monitor one or more card readers, receive transaction data corresponding to transaction conducted through the card readers, identify the common transaction codes correlated to the instances of fraud, and cause display of a notification that includes an indication of the instance of fraud at a client device.

17 Claims, 7 Drawing Sheets

SYSTEM TO IDENTIFY VULNERABLE CARD READERS

TECHNICAL FIELD

The present disclosure generally relates to the technical field of special-purpose machines to detect fraudulent activity, and more particularly to payment card fraud detection in card readers.

BACKGROUND

Credit card skimmers are devices placed on top of actual credit card readers and copy information from magnetic strips of credit cards. While some credit card readers may be developed to make the installation of credit card skimmers difficult, it is currently impossible to identify the existence of a credit card skimmer based on transaction data collected from the credit card reader alone.

BRIEF DESCRIPTION OF THE DRAWINGS

Various ones of the appended drawings merely illustrate example embodiments of the present disclosure and are not intended to limit its scope to the illustrated embodiments. On the contrary, these examples are intended to cover alternatives, modifications, and equivalents as may be included within the scope of the disclosure.

DETAILED DESCRIPTION

Figure 1:
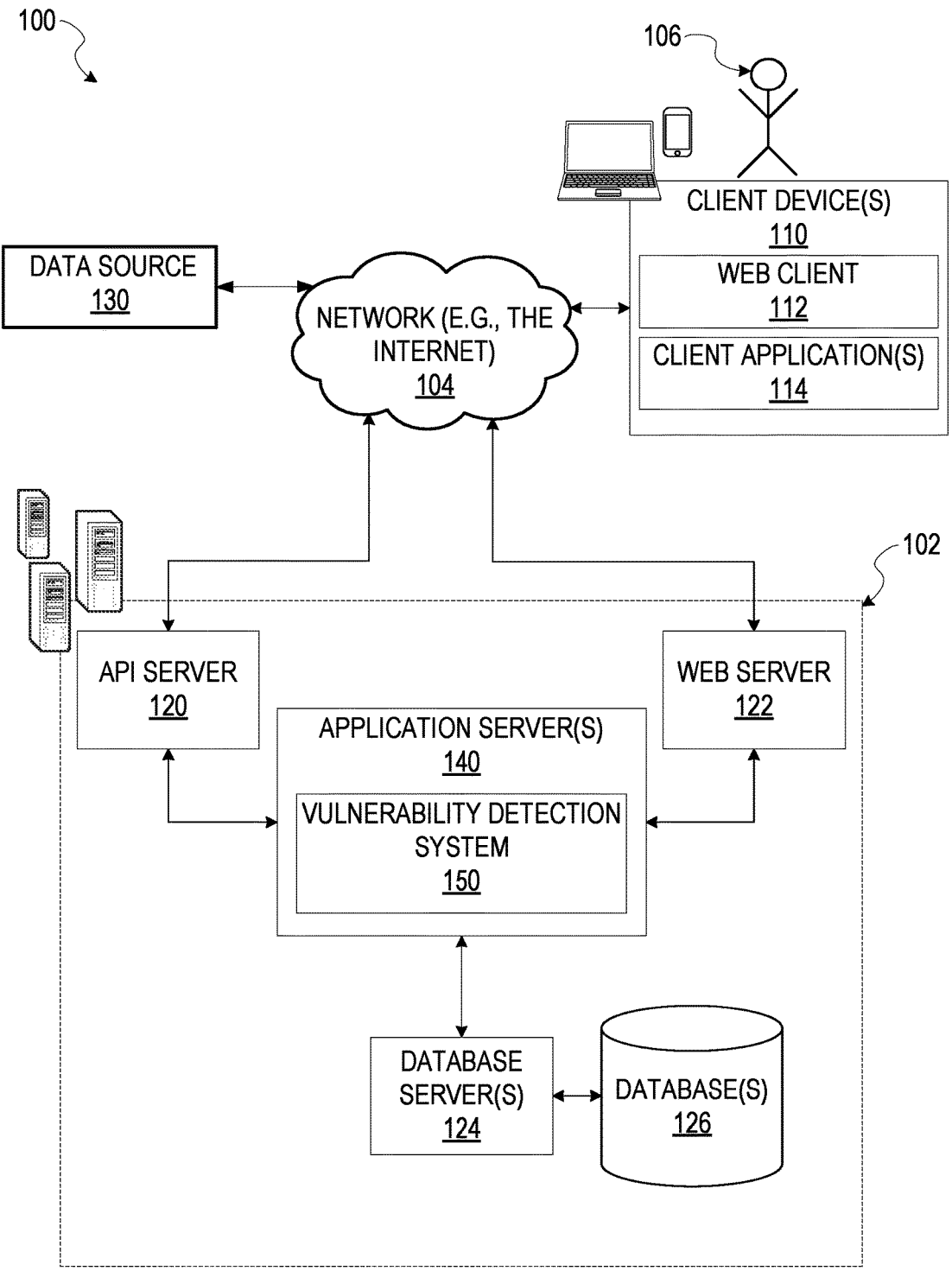
FIG. 1 is a network diagram depicting a network system comprising a group of application servers in communication with a network-based vulnerability detection system configured to detect instances of fraud, consistent with some embodiments.

Reference will now be made in detail to specific example embodiments for carrying out the inventive subject matter of the present disclosure. In the following description, specific details are set forth in order to provide a thorough understanding of the subject matter. It shall be appreciated that embodiments may be practiced without some or all of these specific details.

Example embodiments relate to a network-based vulnerability detection system configured to access a database of customer transaction data corresponding to a set of card readers. The customer transaction data may, for example include transaction codes indicating a status and type of each transaction conducted through the set of card readers. The network-based vulnerability detection system may receive an identification of a set of compromised card readers among the set of card readers, identify common transaction codes within the transaction data of the set of compromised card readers, and correlate the common transaction codes to one or more instances of fraud associated with the compromised set of card readers. In some example embodiments, the vulnerability detection system may be applied to monitor one or more card readers, receive transaction data corresponding to a transaction conducted through the card readers, identify the common transaction codes correlated to the instances of fraud, and cause display of a notification that includes an indication of the instance of fraud at a client device.

A "card reader" is an input device that reads data from card-shaped storage mediums. For example, a card reader may read magnetic strip cards (e.g., credit cards), barcodes, proximity cards (e.g., 26-but Wiegand format), Chip Authentication Program (CAP) cards, as well as smart cards that include embedded microprocessor and memory. Card readers may be used in retail locations to allow an individual to provide payment through the card reader to facilitate a transaction. Card readers are often configured to log transaction data associated with transaction conducted through a card reader, and in some instances may identify and log errors in the transactions as well. For example, a card reader may access a database of "transaction codes" that indicate a status or event associated with a transaction. The database may include a set of pre-configured transaction codes to indicate, among other things: a successful transaction; an incomplete or faulty card swipe; or a declined card. The vulnerability detection system may therefore be configured to access such logs and databases, and correlate particular transaction codes with specific instances of fraud, not previously detectable through a review of transaction codes due to a lack of relevant, specific transaction codes.

The vulnerability detection system may be further configured to monitor transaction data from one or more card readers (e.g., within a retail location), identify a transaction code correlated with an instance of fraud within the transaction data, and in response to the identifying the correlated transaction code, signal a client device to cause display of a notification that includes an indication of the instance of wrong doing. The transaction data monitored may include card reader identifiers, time stamps, transaction codes, as well as card identifiers of cards associated with the corresponding transactions. Upon identifying a transaction code correlated with a particular instance of fraud (e.g., a card skimmer), the vulnerability detection system may cause display of a notification at a client device that includes a presentation of the relevant card reader identifiers associated with the transaction code, the transaction code, time stamp data, and indication of the instance of fraud, as well as other relevant transaction information.

In some example embodiments, the vulnerability detection system monitors the one or more card readers over a period of time, and determines a frequency or rate in which transaction codes correlated with instances of fraud are identified. The period of time may be defined based on a specific time period (e.g., Monday, or Monday from 9:00 am to 12:00 pm), or may be based on a number of transactions conducted through a particular card reader (e.g., fifty transactions), or on a number of card swipe attempts (e.g., fifty card swipes). The vulnerability detection system collects the transaction data over the specified time period and determines a rate, a number, and/or a frequency in which a transaction code correlated to an instance of fraud appears. Based on the rate, number, and/or frequency, the vulnerability detection system calculates a "vulnerability score" of each card reader.

In some example embodiments, the vulnerability detection system may also factor a card reader type into the calculation of the vulnerability score. Card readers may include self-checkout card readers (e.g., card readers that are not managed by an in-person attendant), as well as managed card readers (card readers that are managed by an in person attendant). The vulnerability detection system may access transaction data received from both managed card readers and self-checkout card readers and determine an expected rate, number, and frequency of various transaction codes that appear over a period of time. Having determined an expected rate for both the self-checkout card readers and the managed card readers, the vulnerability detection system may weight a vulnerability score given to a particular card reader based on a normalization function calculated based on the expected rate, number, and frequency.

In some example embodiments, the vulnerability detection system may cause display of the notification upon detecting a transgression of a vulnerability threshold by a vulnerability score. The vulnerability threshold may be defined by a user (e.g., flag all card readers with a vulnerability score above a certain value), or in some embodiments may be determined based on a normalization function and/or a historical time series of vulnerability scores across physical locations (e.g., retail locations). For example, transaction data over a period of time may be reviewed and analyzed in order to determine an occurrence rate of each transaction code among the set of transaction codes. Upon confirming an expected occurrence rate of a transaction code, the vulnerability detection system may calculate a vulnerability threshold.

In some example embodiments, the vulnerability detection system is further configured to disable a card reader in response to identifying a transaction code correlated to an instance of fraud, and/or detecting that a vulnerability score has transgressed the vulnerability threshold. For example, the instance of fraud may include the existence of a card skimmer on the card reader. Upon identifying the correlated transaction code, the vulnerability detection system may cause the card reader to decline further transaction requests, shut off, or otherwise indicate that the card reader is compromised.

FIG. 1 is a network diagram illustrating a network environment 100 suitable for operating a vulnerability detection system 150. A networked system 102 provides server-side functionality, via a network 104 (e.g., an intranet, the Internet or a Wide Area Network (WAN)), to one or more clients such as the client device(s) 110 and server 130. FIG. 1 illustrates a web client 112 and client application(s) 114 executing on respective client device(s) 110.

An Application Program Interface (API) server 120 and a web server 122 are coupled to, and provide programmatic and web interfaces respectively to, one or more application server(s) 140. The application servers 140 host the vulnerability detection system 150. The application server(s) 140 are, in turn, shown to be coupled to one or more database servers 124 that facilitate access to one or more databases 126.

The vulnerability detection system 150 identifies correlations between preconfigured transaction codes and instances of fraud. For example, the vulnerability detection system 150 is configured to access the databases 126 to retrieve transaction data collected from a set of card readers, identify a set of compromised card readers among the set of card readers, and correlate common transaction codes between the compromised card readers with an instance of fraud.

As shown, the network environment 100 includes the client device(s) 110 in communication with the networked system 102 over the network 104. The networked system 102 communicates and exchanges data with the client device(s) 110 that pertains to various functions and aspects associated with the networked system 102 and its users. Likewise, the client device(s) 110, which may be any of a variety of types of devices that include at least a display, a processor, and communication capabilities that provide access to the network 104 (e.g., a smart phone, a tablet computer, a personal digital assistant (PDA), a personal navigation device (PND), a handheld computer, a desktop computer, a laptop or netbook, or a wearable computing device), may be operated by a user (e.g., a person) of the networked system 102 to exchange data with the networked system 102 over the network 104.

The client device(s) 110 communicates with the network 104 via a wired or wireless connection. For example, one or more portions of the network 104 may comprises an ad hoc network, an intranet, an extranet, a Virtual Private Network (VPN), a Local Area Network (LAN), a wireless LAN (WLAN), a Wide Area Network (WAN), a wireless WAN (WWAN), a Metropolitan Area Network (MAN), a portion of the Internet, a portion of the Public Switched Telephone Network (PSTN), a cellular telephone network, a wireless network, a Wireless Fidelity (Wi-Fi®) network, a Worldwide Interoperability for Microwave Access (WiMax) network, another type of network, or any suitable combination thereof.

In various embodiments, the data exchanged between the client device(s) 110 and the networked system 102 may involve user-selected functions available through one or more user interfaces (UIs). The UIs may be specifically associated with the web client 112 (e.g., a browser) or the client application 114, executing on the client device(s) 110, and in communication with the networked system 102.

Figure 2:
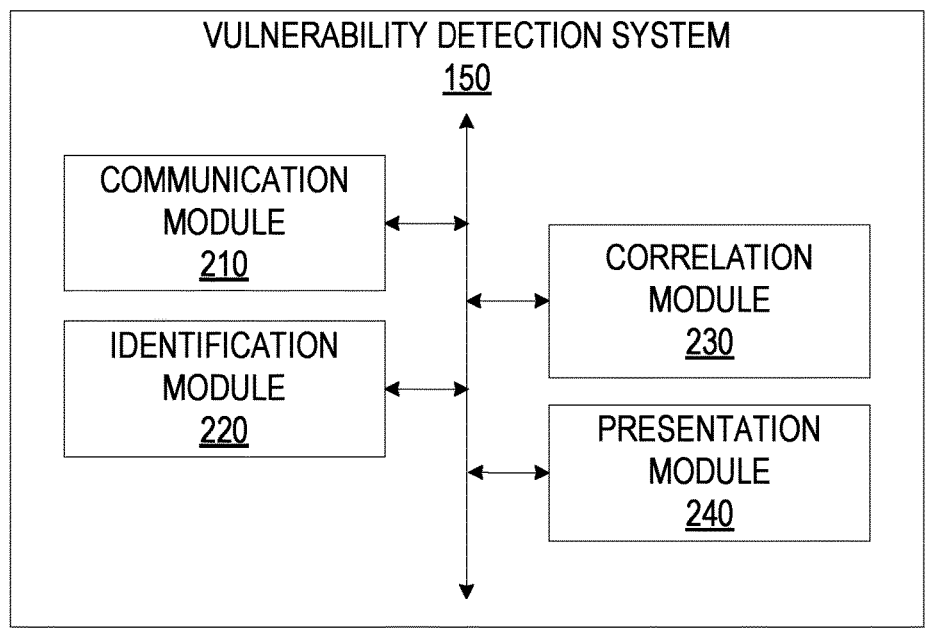
FIG. 2 is a block diagram illustrating various components of the vulnerability detection system, which is provided as part of the network system, consistent with some embodiments.

FIG. 2 is a block diagram illustrating various components of the vulnerability detection system 150, which is provided as part of the networked system 102, consistent with some embodiments. To avoid obscuring the inventive subject matter with unnecessary detail, various functional components (e.g., modules and engines) that are not germane to conveying an understanding of the inventive subject matter have been omitted from FIG. 2. However, a skilled artisan will readily recognize that various additional functional components may be supported by the vulnerability detection system 150 to facilitate additional functionality that is not specifically described herein.

As is understood by skilled artisans in the relevant computer arts, each functional component (e.g., module) illustrated in FIG. 2 may be implemented using hardware (e.g., a processor of a machine) or a combination of logic (e.g., executable software instructions) and hardware (e.g., memory and processor of a machine) for executing the logic. Furthermore, the various functional components depicted in FIG. 2 may reside on a single computer (e.g., a laptop), or may be distributed across several computers in various arrangements such as cloud-based architectures. Moreover, any two or more modules of the vulnerability detection system 150 may be combined into a single module, or subdivided among multiple modules. It shall be appreciated that while the functional components (e.g., modules) of FIG.

2 are discussed in the singular sense, in other embodiments, multiple instances of one or more of the modules may be employed.

The communication module 210 provides functionality to communicate with client devices (e.g., client devices 110), data source 130 (e.g., a card reader), and databases 126 in order to access transaction data, cause display of notifications, or signal card readers. The transaction data may for example include card reader identifiers, transaction amounts, time stamps, transaction codes, as well as card identifiers of cards associated with the corresponding transactions.

The identification module 220 provides functionality to identify common transaction codes between compromised card readers among a set of card readers. In response to the communications module 210 accessing transaction data at the database 126, the identification module 220 may identify common transaction codes among the transaction data of a set of compromised card readers. The identification module 220 may receive an identification of a set of compromised card readers among the set of card readers (e.g., based on card reader identifiers). The identification module 220 may flag the common transaction codes for the correlation module 230. The correlation module 230 provides functionality to define correlations between the common transaction codes identified by the identification module 220 and instances of fraud (e.g., a card skimmer). The correlation module 230 may store the correlations within the database 126.

The presentation module 240 provides functionality to generate and cause display of a notification at a client device 110. For example, in response to identifying a common transaction code correlated to an instance of fraud, the presentation module 240 may generate and cause display of a notification at a client device 110. The notification includes an indication of a card reader identifier, and corresponding transaction data that include the common transaction code.

Figure 3:
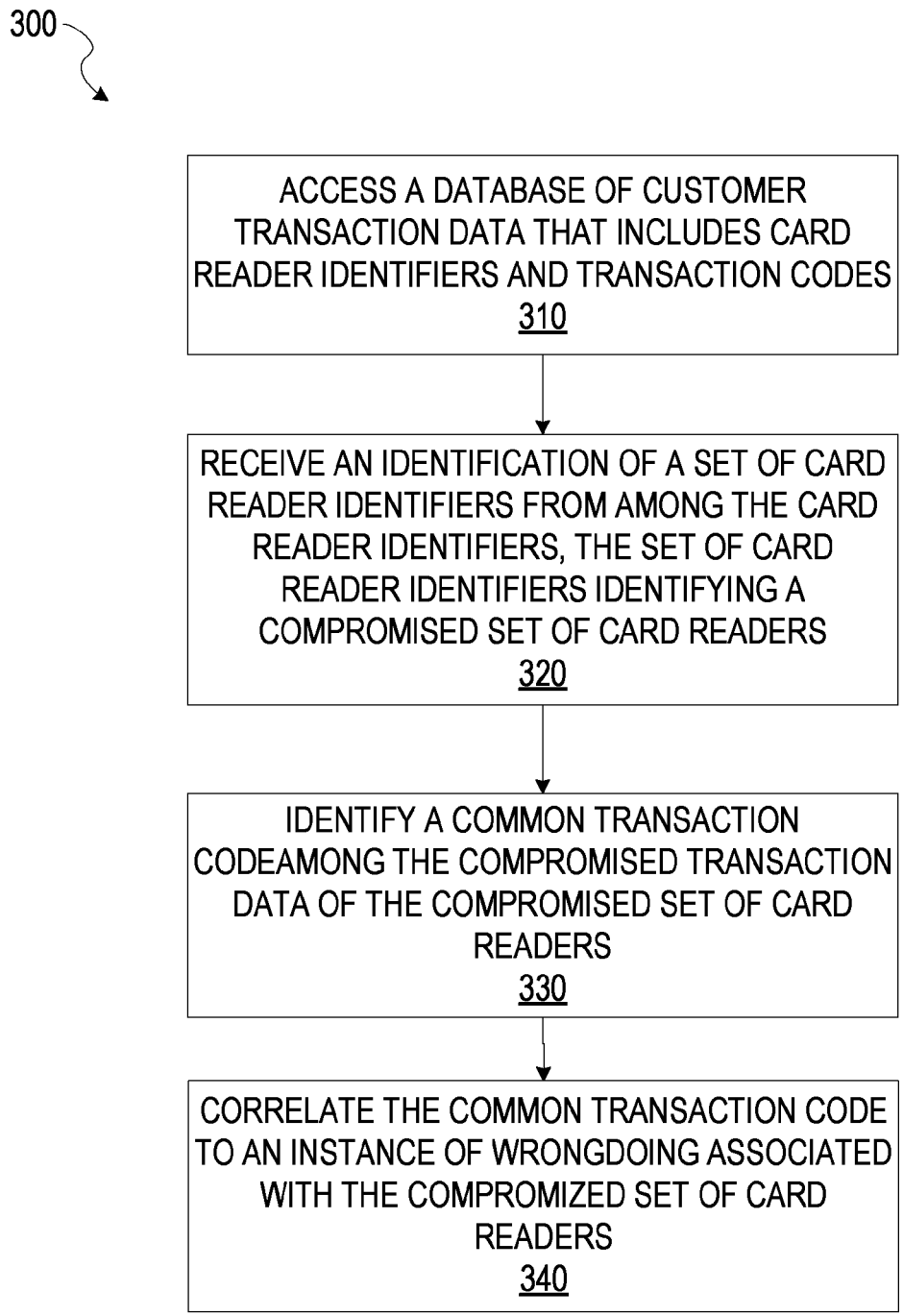
FIG. 3 is a flowchart illustrating a method for correlating existing transaction codes with an instance of fraud, consistent with example embodiments.

FIG. 3 is a flowchart illustrating a method 300 for correlating existing transaction codes with an instance of fraud, according to some example embodiments. The method 300 is embodied in computer-readable instructions for execution by one or more processors such that the operations of the method 300 are performed in part or in whole by the network-based vulnerability detection system 150; accordingly, the method 300 is described below by way of example with reference thereto. However, it shall be appreciated that at least some of the operations of the method 300 may be deployed on various other hardware configurations, and the method 300 is not intended to be limited to the network-based vulnerability detection system 150.

At operation 310, the communication module 210 communicates a request to the database server 124 to access the database 126 to retrieve transaction data. The database 126 may collect and store transaction data from a set of card readers. The transaction data may for example include card reader identifiers, time stamps, transaction codes, as well as card identifiers of cards associated with the corresponding transactions.

At operation 320, the identification module 220 receives an identification of a compromised set of card readers among the set of card reader identifiers corresponding to the transaction data. The identification may be based on a set of card reader identifiers, or transaction data that corresponds to a compromised set of card readers. For example, the identification module 220 may receive a time period in which all card readers that conducted transactions were compromised, or a card identifier that was known to have been compromised, such that all card readers that include transaction data indicating the card identifier may be compromised. Based on the transaction data, the identification module 20 flags the compromised set of card readers.

At operation 330, the identification module 220 analyzes the transaction data associated with the compromised set of card readers to identify common transaction codes. The transaction codes may include preconfigured transaction codes of the card readers that are intended to indicate a status or event associated with a transaction. For example, the transaction codes may indicate: completion of a successful transaction; an incomplete or faulty card swipe; or a declined card.

At operation 340, having identified the common transaction codes within the transaction data of the set of compromised card readers, the identification module 220 transmits the common transaction codes to the correlation module 230, which then correlates the common transaction code with an instance of fraud. The instance of fraud may for example include a card skimmer installed on the set of compromised card readers. The correlation module 230 may store the correlation within the database 126.

Figure 4:
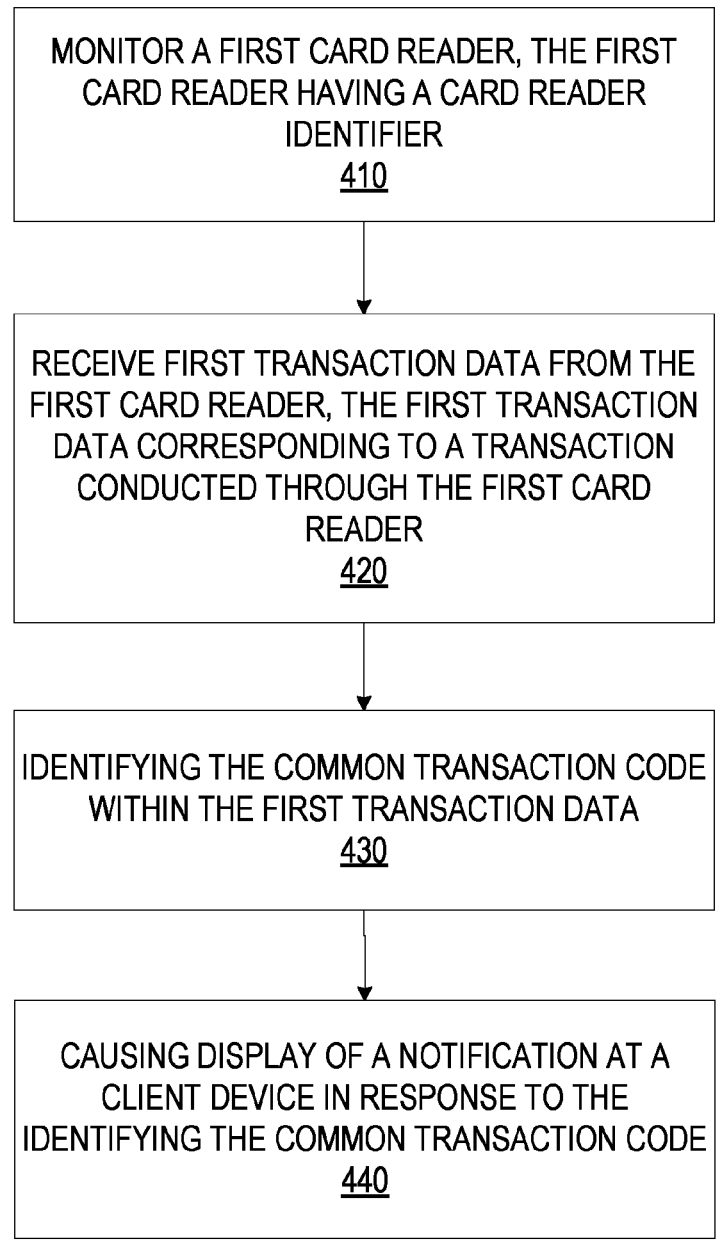
FIG. 4 is a flowchart illustrating a method for identifying an instance of fraud based on existing transaction codes, consistent with some example embodiments.

FIG. 4 is a flowchart illustrating additional operations of the method 300, for identifying an instance of fraud based on existing transaction codes, according to some example embodiments. As discussed with reference to FIG. 3, the vulnerability detection system 150 is configured to correlate instances of fraud with preconfigured transaction codes of a card reader. The preconfigured transaction codes may not necessarily indicate a particular, specific instance of fraud.

The method 300 is embodied in computer-readable instructions for execution by one or more processors such that the operations of the method 400 are performed in part or in whole by the network-based vulnerability detection system 150; accordingly, the method 300 is described below by way of example with reference thereto. However, it shall be appreciated that at least some of the operations of the method 300 may be deployed on various other hardware configurations, and the method 300 is not intended to be limited to the network-based vulnerability detection system 150. As shown in FIG. 4, one or more operations 410, 420, 430 and 440 may be performed as part (e.g., a precursor task, a subroutine, or a portion) of the method 300, in which the vulnerability detection system 150 correlated existing transaction codes to instances of fraud, according to some example embodiments.

At operation 410, the communication module 210 monitors a set of card readers. Each card reader has an associated card reader identifier. The set of card readers may be located within a specific physical location, or at multiple physical locations. For example, the card readers may include a set of Automated Teller Machine (ATM) distributed across a particular geographic area, or may be card readers located within a single retail location of a retailer.

At operation 420, the communication module 210 receives transaction data from a card reader from among the set of card readers being monitored. The transaction data corresponds to a transaction conducted through the card reader. For example, the transaction may include a request to retrieve funds from an ATM machine, or a request to purchase items at the retail location.

At operation 430, the identification module 220 identifies the transaction code correlated with the instance of fraud within the transaction data of the card reader being monitored. In response to identifying the transaction code correlated with the instance of fraud, the presentation module 240 generates and causes display of a notification at a client device 110. The notification includes transaction data of the card reader, such as the transaction code correlated with the instance of fraud. To cause display of the notification at the client device 110, the presentation module 240 may generate a set of instructions that, when executed by the client device 110, cause the client device 110 to display the notification.

In some example embodiments, the presentation module 240 may disable, or interrupt an ongoing (or previously conducted) transaction conducted through the card reader associated with the transaction code correlated with the instance of fraud in order to prevent fraud. Additionally, the presentation module 240 may deliver a notification to a user account associated with a set of card identifiers identified within the transaction data of the card reader, due to the possibility that the cards associated with the card identifiers may be compromised.

Figure 5:
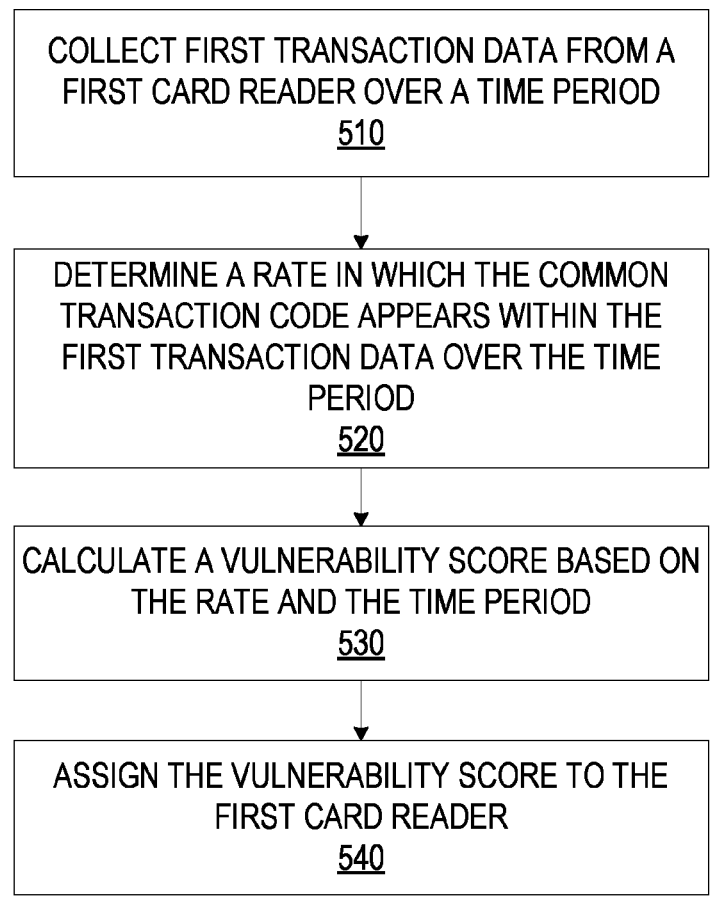
FIG. 5 is a flowchart illustrating a method for calculating a vulnerability score of a card reader based on transaction data, consistent with some embodiments.

FIG. 5 is a flowchart illustrating additional operations of the method 300 for calculating a vulnerability score of a card reader based on transaction data, consistent with some embodiments. As shown in FIG. 5, one or more operations 510, 520, 530, and 540 may be performed as part (e.g., a precursor task, a subroutine, or a portion) of the method 300, in which the vulnerability detection system 150 correlated existing transaction codes to instances of fraud, according to some example embodiments.

At operation 510, the communication module 210 accesses the database 126 to retrieve transaction data of a card reader (e.g., a first card reader) over a period of time. The period of time may be defined as a temporal period (e.g., "January $1^{st}$ through January $9^{th}$," "8:00 am through 5:00 pm," etc.), and/or as a number of transaction conducted on the first card reader (e.g., the last fifty transactions).

At operation 520, the identification module 220 determines one or more of a rate, number, and a frequency in which the common transaction code correlated with the instance of fraud appears within the transaction data over the time period defined in operation 510. For example, the rate may indicate that the transaction code appears in every transaction conducted on the card reader, and the number may indicate a number of times in which the transaction code appears over the time period.

At operation 530, the identification module 220 calculates a vulnerability score of the first card reader based on one or more of the rate, number, and the frequency determined at operation 520. For example, the rate, number, and/or frequency in which the common transaction code appears is divided by a combination of the hourly or daily frequency of all transaction conducted through the card reader to obtain a ratio. To calculate the vulnerability score, the identification module 220 applies one or more statistical techniques (e.g., Kolmogorov-Smirnov Test) to observe the ratio over the course of the period of time (as discussed with respect to operation 510) as compared with a sample set of ratios collected from the card reader from a different period of time (e.g., the preceding week, day, etc.) and/or from similar card readers during the same time period. The card reader is thereby assigned the vulnerability score. In some example embodiments, the identification module 220 may also calculate and assign a vulnerability score to the card readers used to calculate the sample ratios. The vulnerability score indicates a likelihood that a particular card reader is vulnerable, or compromised by an instance of fraud. In some example embodiments, the vulnerability detection system 150 may also access the database 126 to determine an expected rate of the transaction code correlated with the instance of fraud in the set of card readers. Based on the expected rate, the identification module 220 may weight the vulnerability score accordingly.

In some embodiments, the vulnerability detection system 150 may cause display of the notification upon detecting a transgression of a vulnerability threshold by a vulnerability score. The vulnerability threshold may be either a maximum or a minimum value depending on the embodiment. Accordingly, depending on the embodiment, the vulnerability score may transgress the threshold score by being greater than a maximum value or by being less than a minimum value. The vulnerability threshold may be defined by a user (e.g., flag all card readers with a vulnerability score above or below X), or in some embodiments may be determined based on a normalization function.

Figure 6:
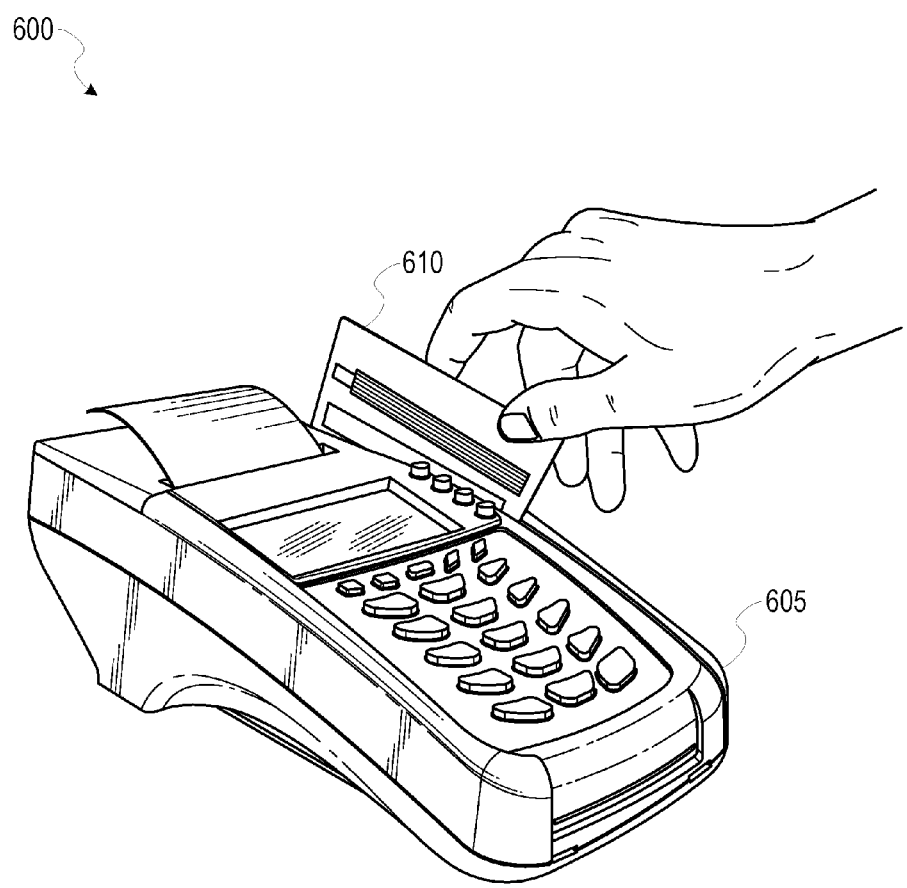
FIG. 6 is a diagram illustrating a potentially vulnerable card reader, consistent with some embodiments.

FIG. 6 is a diagram 600 illustrating a potentially vulnerable card reader 605, consistent with some embodiments. FIG. 6 includes a card reader 605 and a card 610 (e.g., a credit card). The card reader 605 may include a preconfigured set of transaction codes, as discussed above. The transaction codes indicate a status of a transaction, or a status of the card reader 605 itself. As the card 610 is swiped through the card reader 605, the card reader 605 may determine a status of the transaction and select an appropriate transaction code based on the determined status.

For example, the card reader 605 may determine that when the card 610 was swiped, the network connectivity was limited and the transaction failed to complete. As such, the card reader 605 may have a preconfigured transaction code to indicate that the network connectivity was limited. Similarly, upon swiping the card 610, the card reader 605 may determine that it was unable to read the card 610. The card reader 605 may thereby transmit a message to the database 126 that includes an indication that the card reader 605 was unable to read the card 610.

Figure 7:
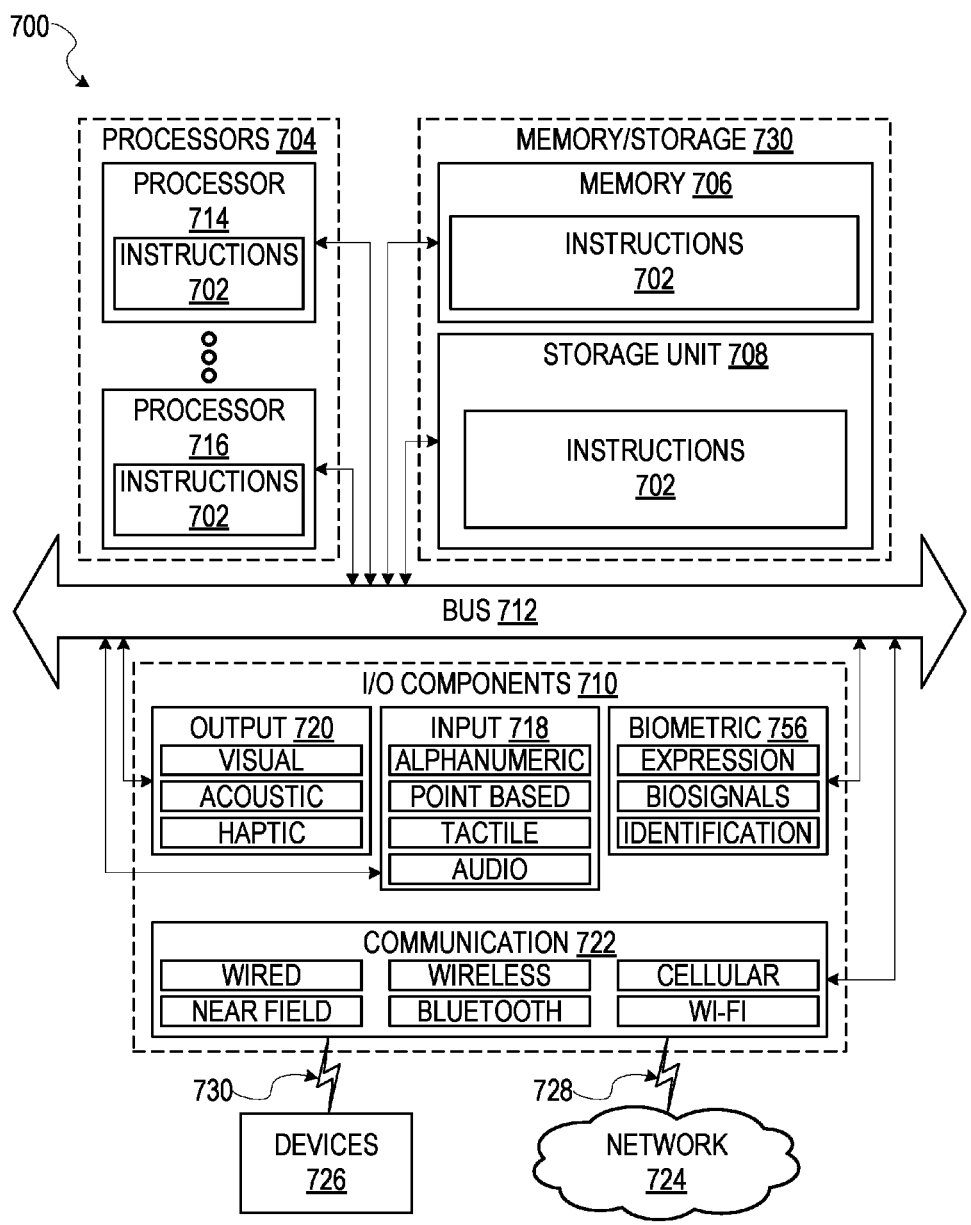
FIG. 7 is a diagrammatic representation of a machine in the example form of a computer system within which a set of instructions for causing the machine to perform any one or more of the methodologies discussed herein may be executed.

FIG. 7 is a diagrammatic representation of a machine in the example form of a computer system within which a set of instructions for causing the machine to perform any one or more of the methodologies discussed herein may be executed. Specifically, FIG. 7 shows a diagrammatic representation of the machine 700 in the example form of a system, within which instructions 702 (e.g., software, a program, an application, an applet, an app, a driver, or other executable code) for causing the machine 700 to perform any one or more of the methodologies discussed herein may be executed. For example, the instructions 702 include executable code that causes the machine 700 to execute the method 300. In this way, these instructions 702 transform the general, non-programmed machine into a particular machine programmed to carry out the described and illustrated functions in the manner described herein. The machine 700 may operate as a standalone device or may be coupled (e.g., networked) to other machines.

By way of non-limiting example, the machine 700 may comprise or correspond to a television, a computer (e.g., a server computer, a client computer, a personal computer (PC), a tablet computer, a laptop computer, or a netbook), a set-top box (STB), a personal digital assistant (PDA), an entertainment media system (e.g., an audio/video receiver), a cellular telephone, a smart phone, a mobile device, a wearable device (e.g., a smart watch), a portable media player, or any machine capable of outputting audio signals and capable of executing the instructions 702, sequentially or otherwise, that specify actions to be taken by machine 700. Further, while only a single machine 700 is illustrated, the term "machine" shall also be taken to include a collection of machines 700 that individually or jointly execute the instructions 702 to perform any one or more of the methodologies discussed herein.

The machine 700 may include processors 704, memory 706, storage unit 708 and I/O components 710, which may be configured to communicate with each other such as via a bus 712. In an example embodiment, the processors 704 (e.g., a central processing unit (CPU), a reduced instruction set computing (RISC) processor, a complex instruction set computing (CISC) processor, a graphics processing unit (GPU), a digital signal processor (DSP), an application specific integrated circuit (ASIC), a radio-frequency integrated circuit (RFIC), another processor, or any suitable combination thereof) may include, for example, processor 714 and processor 716 that may execute instructions 702. The term "processor" is intended to include multi-core processors that may comprise two or more independent processors (sometimes referred to as "cores") that may execute instructions 702 contemporaneously. Although FIG. 7 shows multiple processors 704, the machine 700 may include a single processor with a single core, a single processor with multiple cores (e.g., a multi-core processor), multiple processors with a single core, multiple processors with multiples cores, or any combination thereof.

The memory 706 (e.g., a main memory or other memory storage) and the storage unit 708 are both accessible to the processors 704 such as via the bus 712. The memory 706 and the storage unit 708 store the instructions 702 embodying any one or more of the methodologies or functions described herein. In some embodiments, the database(s) 126 resides on the storage unit 708. The instructions 702 may also reside, completely or partially, within the memory 706, within the storage unit 708, within at least one of the processors 704 (e.g., within the processor's cache memory), or any suitable combination thereof, during execution thereof by the machine 700. Accordingly, the memory 706, the storage unit 708, and the memory of processors 704 are examples of machine-readable media.

As used herein, "machine-readable medium" means a device able to store instructions and data temporarily or permanently and may include, but is not be limited to, random-access memory (RAM), read-only memory (ROM), buffer memory, flash memory, optical media, magnetic media, cache memory, other types of storage (e.g., erasable programmable read-only memory (EEPROM)), or any suitable combination thereof. The term "machine-readable medium" should be taken to include a single medium or multiple media (e.g., a centralized or distributed database, or associated caches and servers) able to store instructions 702. The term "machine-readable medium" shall also be taken to include any medium, or combination of multiple media, that is capable of storing instructions (e.g., instructions 702) for execution by a machine (e.g., machine 700), such that the instructions, when executed by one or more processors of the machine 700 (e.g., processors 704), cause the machine 700 to perform any one or more of the methodologies described herein (e.g., methods 400 and 500). Accordingly, a "machine-readable medium" refers to a single storage apparatus or device, as well as "cloud-based" storage systems or storage networks that include multiple storage apparatus or devices. The term "machine-readable medium" excludes signals per se.

Furthermore, the "machine-readable medium" is non-transitory in that it does not embody a propagating signal. However, labeling the tangible machine-readable medium as "non-transitory" should not be construed to mean that the medium is incapable of movement—the medium should be considered as being transportable from one real-world location to another. Additionally, since the machine-readable medium is tangible, the medium may be considered to be a machine-readable device.

The I/O components 710 may include a wide variety of components to receive input, provide output, produce output, transmit information, exchange information, capture measurements, and so on. The specific I/O components 710 that are included in a particular machine will depend on the type of machine. For example, portable machines such as mobile phones will likely include a touch input device or other such input mechanisms, while a headless server machine will likely not include such a touch input device. It will be appreciated that the I/O components 710 may include many other components that are not specifically shown in FIG. 7. The I/O components 710 are grouped according to functionality merely for simplifying the following discussion and the grouping is in no way limiting. In various example embodiments, the I/O components 710 may include input components 718 and output components 720. The input components 718 may include alphanumeric input components (e.g., a keyboard, a touch screen configured to receive alphanumeric input, a photo-optical keyboard, or other alphanumeric input components), point based input components (e.g., a mouse, a touchpad, a trackball, a joystick, a motion sensor, or other pointing instrument), tactile input components (e.g., a physical button, a touch screen that provides location and/or force of touches or touch gestures, or other tactile input components), audio input components, and the like. The output components 720 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth.

Communication may be implemented using a wide variety of technologies. The I/O components 710 may include communication components 722 operable to couple the machine 700 to a network 724 or devices 726 via coupling 728 and coupling 730, respectively. For example, the communication components 722 may include a network interface component or other suitable device to interface with the network 724. In further examples, communication components 722 may include wired communication components, wireless communication components, cellular communication components, near field communication (NFC) components, Bluetooth® components (e.g., Bluetooth® Low Energy), Wi-Fi® components, and other communication components to provide communication via other modalities. The devices 726 may be another machine or any of a wide variety of peripheral devices (e.g., a peripheral device coupled via a Universal Serial Bus (USB)).

Modules, Components and Logic

Certain embodiments are described herein as including logic or a number of components, modules, or mechanisms. Modules may constitute either software modules (e.g., code embodied on a machine-readable medium or in a transmission signal) or hardware modules. A hardware module is a tangible unit capable of performing certain operations and may be configured or arranged in a certain manner. In example embodiments, one or more computer systems (e.g., a standalone, client, or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field-programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired) or temporarily configured (e.g., programmed) to operate in a certain manner and/or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses that connect the hardware modules). In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or more processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment, or a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., APIs).

Electronic Apparatus and System

Example embodiments may be implemented in digital electronic circuitry, or in computer hardware, firmware, or software, or in combinations of them. Example embodiments may be implemented using a computer program product, for example, a computer program tangibly embodied in an information carrier, for example, in a machine-readable medium for execution by, or to control the operation of, data processing apparatus, for example, a programmable processor, a computer, or multiple computers.

A computer program can be written in any form of programming language, including compiled or interpreted languages, and it can be deployed in any form, including as a standalone program or as a module, subroutine, or other unit suitable for use in a computing environment. A computer program can be deployed to be executed on one computer or on multiple computers at one site, or distributed across multiple sites and interconnected by a communication network.

In example embodiments, operations may be performed by one or more programmable processors executing a computer program to perform functions by operating on input data and generating output. Method operations can also be performed by, and apparatus of example embodiments may be implemented as, special purpose logic circuitry (e.g., an FPGA or an ASIC).

The computing system can include clients and servers. A client and server are generally remote from each other and typically interact through a communication network. The relationship of client and server arises by virtue of computer programs running on the respective computers and having a client-server relationship to each other. In embodiments deploying a programmable computing system, it will be appreciated that both hardware and software architectures merit consideration. Specifically, it will be appreciated that the choice of whether to implement certain functionality in permanently configured hardware (e.g., an ASIC), in temporarily configured hardware (e.g., a combination of software and a programmable processor), or in a combination of permanently and temporarily configured hardware may be a design choice. Below are set out hardware (e.g., machine) and software architectures that may be deployed, in various example embodiments.

Language

Although the embodiments of the present invention have been described with reference to specific example embodiments, it will be evident that various modifications and changes may be made to these embodiments without departing from the broader scope of the inventive subject matter. Accordingly, the specification and drawings are to be regarded in an illustrative rather than a restrictive sense. The accompanying drawings that form a part hereof show, by way of illustration, and not of limitation, specific embodiments in which the subject matter may be practiced. The embodiments illustrated are described in sufficient detail to enable those skilled in the art to practice the teachings disclosed herein. Other embodiments may be used and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent, to those of skill in the art, upon reviewing the above description.

All publications, patents, and patent documents referred to in this document are incorporated by reference herein in their entirety, as though individually incorporated by reference. In the event of inconsistent usages between this document and those documents so incorporated by reference, the usage in the incorporated references should be considered supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended; that is, a system, device, article, or process that includes elements in addition to those listed after such a term in a claim are still deemed to fall within the scope of that claim.

What is claimed is:

1. A method comprising:
   accessing a database of customer transaction data that includes card reader identifiers and transaction codes, the card reader identifiers and the transaction codes corresponding to a set of transactions conducted through a set of card readers identified by the card reader identifiers;
   receiving an identification of a set of card reader identifiers from among the card reader identifiers, the set of card reader identifiers identifying a set of compromised card readers from among the set of card readers, and the customer transaction data further including compromised transaction data corresponding to the set of compromised card readers;
   identifying a common transaction code from the compromised transaction data of the set of compromised card readers;
   correlating the common transaction code to an instance of fraud associated with the compromised set of card readers;
   monitoring a first card reader, the first card reader having a first card reader identifier;
   receiving first transaction data from the first card reader, the first transaction data corresponding to a transaction conducted through the first card reader, and including the common transaction code;
   identifying the common transaction code within the first transaction data; and
   causing display of a notification at a client device in response to the identifying the common transaction code, the notification including an indication of the first card reader identifier.

2. The method of claim 1, wherein the first transaction data includes a card number, and transaction details, and the method further comprises:
   generating a report that includes the card number and the transaction details.

3. The method of claim 1, wherein the method further comprises:
   causing an interruption of the transaction associated with the first transaction data in response to the identifying the common transaction code within the first transaction data.

4. The method of claim 1, wherein the method further comprises:
   collecting first transaction data from a first card reader over a time period;
   determining a rate in which the common transaction code appears within the first transaction data over the time period;
   calculating a vulnerability score based on the rate and the time period; and
   assigning the vulnerability score to the first card reader.

5. The method of claim 4, wherein the method further comprises:
   determining that the vulnerability score transgresses a threshold value, the threshold value indicating that the first card reader has been compromised; and
   causing display of a notification at a client device in response to the determining that the badness score transgresses the threshold value, the notification including a display of the vulnerability score and a first identifier of the first card reader.

6. The method of claim 4, wherein the time period is defined by a number of transactions conducted through the first card reader.

7. The method of claim 4, wherein the time period is defined by a duration of time.

8. The method of claim 1, wherein the transaction codes include time stamps, and the method further comprises:
   collecting first transaction data from a first card reader over a time period;
   determining a number of instances in which the common transaction code appears within the first transaction data over the time period, based on the time stamps of the transaction codes;
   calculating a vulnerability score based on the frequency and the time period; and
   assigning the vulnerability score to the first card reader.

9. The method of claim 1, wherein the method further comprises:
monitoring a first card reader, the first card reader having a first card reader identifier;
receiving first transaction data from the first card reader, the first transaction data corresponding to a transaction conducted through the first card reader, and including the common transaction code;
identifying the common transaction code within the first transaction data; and
disabling the first card reader in response to the identifying the common transaction code.

10. The method of claim 1, wherein the transaction codes include error codes.

11. The method of claim 1, wherein the instance of fraud includes a skimmer installed on a card reader.

12. The system of claim 11, wherein the instructions cause the system to perform operations further comprising:
collecting first transaction data from a first card reader over a time period;
determining a number of instances in which the common transaction code appears within the first transaction data over the time period;
calculating a vulnerability score based on the rate and the time period; and
assigning the vulnerability score to the first card reader.

13. The system of claim 12, wherein the instructions cause the system to perform operations further comprising:
determining that the vulnerability score transgresses a threshold value, the threshold value indicating that the first card reader has been compromised; and
causing display of a notification at a client device in response to the determining that the badness score transgresses the threshold value, the notification including a display of the vulnerability score and a first identifier of the first card reader.

14. A system comprising:
one or more processors of a machine; and
a memory storing instructions that, when executed by at least one processor among the one or more processors, causes the machine to perform operations comprising:
accessing a database of customer transaction data that includes card reader identifiers and transaction codes, the card reader identifiers and the transaction codes corresponding to a set of transactions conducted through a set of card readers identified by the card reader identifiers;
receiving an identification of a set of card reader identifiers from among the card reader identifiers, the set of card reader identifiers identifying a set of compromised card readers from among the set of card readers, and the customer transaction data further including compromised transaction data corresponding to the set of compromised card readers;
identifying a common transaction code from the compromised transaction data of the set of compromised card readers;
correlating the common transaction code to an instance of fraud associated with the compromised set of card readers;
monitoring a first card reader, the first card reader having a first card reader identifier;
receiving first transaction data from the first card reader, the first transaction data corresponding to a transaction conducted through the first card reader, and including the common transaction code;
identifying the common transaction code within the first transaction data; and
causing display of a notification at a client device in response to the identifying the common transaction code, the notification including an indication of the first card reader identifier.

15. The system of claim 14, wherein the first transaction data includes a card number, and transaction details, and the instructions cause the system to perform operations further comprising:
generating a report that includes the card number and the transaction details.

16. The system of claim 14, wherein the instructions cause the system to perform operations further comprising:
causing an interruption of the transaction associated with the first transaction data in response to the identifying the common transaction code within the first transaction data.

17. A non-transitory machine-readable storage medium comprising instructions that, when executed by one or more processors of a machine, cause the machine to perform operations comprising:
accessing a database of customer transaction data that includes card reader identifiers and transaction codes, the card reader identifiers and the transaction codes corresponding to a set of transactions conducted through a set of card readers identified by the card reader identifiers;
receiving an identification of a set of card reader identifiers from among the card reader identifiers, the set of card reader identifiers identifying a set of compromised card readers from among the set of card readers, and the customer transaction data further including compromised transaction data corresponding to the set of compromised card readers;
identifying a common transaction code from the compromised transaction data of the set of compromised card readers;
correlating the common transaction code to an instance of fraud associated with the compromised set of card readers;
monitoring a first card reader, the first card reader having a first card reader identifier;
receiving first transaction data from the first card reader, the first transaction data corresponding to a transaction conducted through the first card reader, and including the common transaction code;
identifying the common transaction code within the first transaction data; and
causing display of a notification at a client device in response to the identifying the common transaction code, the notification including an indication of the first card reader identifier.

\* \* \* \* \*